March 2, 1937.  A. P. SACHS  2,072,131
PROCESS OF AND APPARATUS FOR CONVERTING
HYDROCARBON OILS IN THE VAPOR PHASE
Filed Feb. 18, 1932   2 Sheets-Sheet 1

INVENTOR
ALBERT P. SACHS
BY HIS ATTORNEY

March 2, 1937. A. P. SACHS 2,072,131
PROCESS OF AND APPARATUS FOR CONVERTING
HYDROCARBON OILS IN THE VAPOR PHASE
Filed Feb. 18, 1932 2 Sheets-Sheet 2
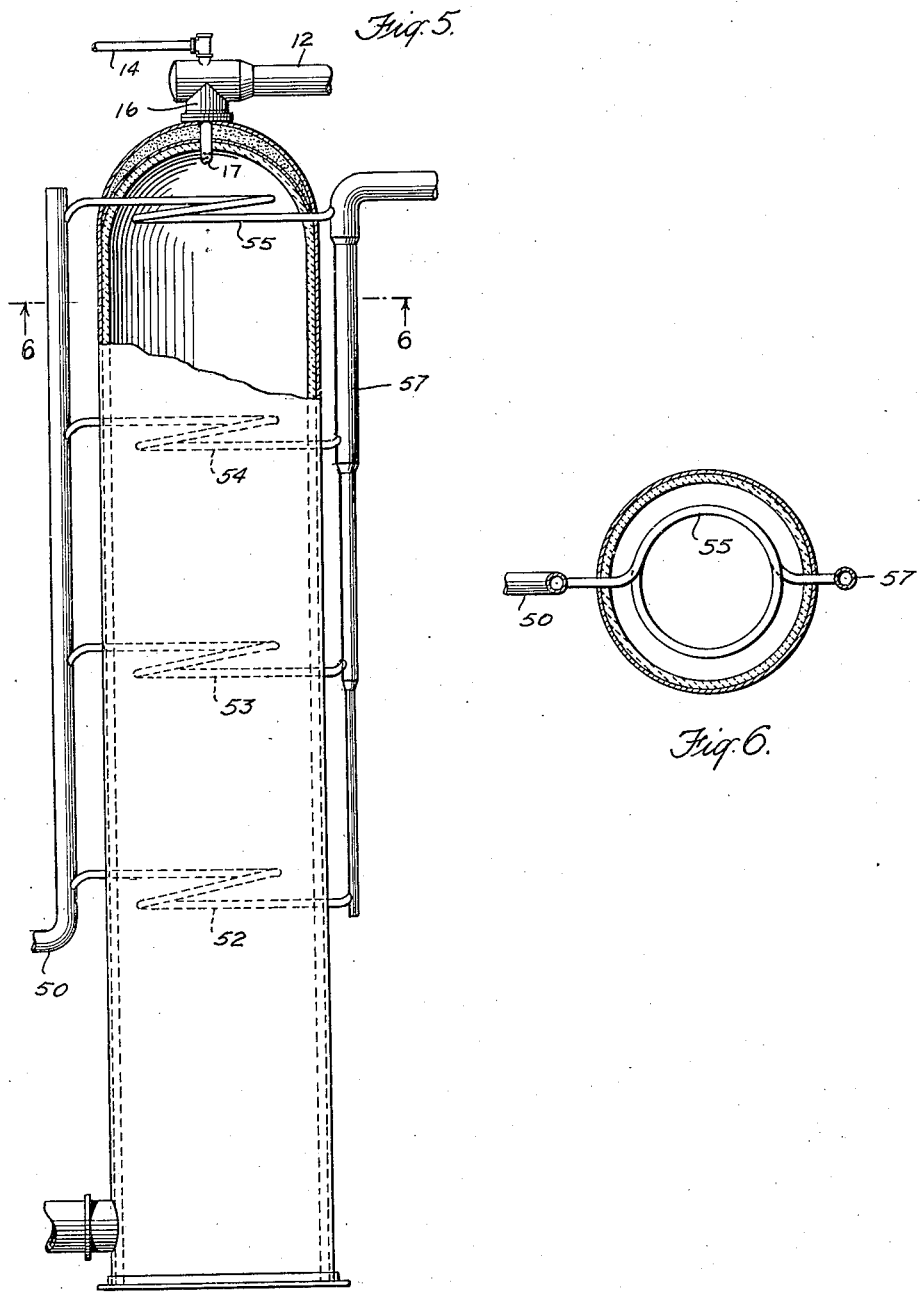
INVENTOR
ALBERT P. SACHS
BY HIS ATTORNEY Patented Mar. 2, 1937

2,072,131

UNITED STATES PATENT OFFICE 2,072,131

PROCESS OF AND APPARATUS FOR CONVERTING HYDROCARBON OILS IN THE VAPOR PHASE

Albert P. Sachs, Brooklyn, N. Y., assignor to Petroleum Conversion Corporation, New York, N. Y., a corporation of Delaware Application February 18, 1932, Serial No. 593,723

6 Claims. (Cl. 196—62)

The present invention relates to improvements in process of and apparatus for converting hydrocarbon oils in the vapor phase. The invention relates to the type of cracking process and apparatus exemplified by United States application Serial No. 65,906, filed October 31, 1925, now Patent No. 1,842,318, issued January 19, 1932, in which the conversion is effected by vaporizing the oil, and then mingling the vapor with a heated heat-carrier gas of sufficient temperature and heat units in a reaction chamber of a size sufficient to permit the conversion reaction to proceed to the desired point of completion.

In the reaction chamber the temperature changes in a vertical direction both because the reaction of cracking is endothermic and further because of radiation. Similarly, if the temperatures be plotted in a horizontal direction through the chamber, there will be a drop in temperature from the center of the chamber to the periphery which is due substantially entirely to radiation. This condition may be otherwise expressed by saying that a descending temperature gradient occurs in a horizontal direction outwardly of the chamber. It is the object of the present invention to compensate for this loss due to radiation whereby the temperature gradient will either be zero or will be reversed, i. e. will ascend slightly in a direction outwardly of the chamber.

For the carrying out of my invention I have provided a form of reaction chamber which is provided with heating surfaces which are maintained at a slightly higher temperature than the temperature of the reacting materials. Preferably, I modify the reaction chamber heretofore in use, which consists of a cylindrical shell having a heat insulating lining, by providing an internal shell which now constitutes the reaction chamber proper, such inner shell being spaced from the refractory lining and forming with the refractory lining a jacket through which a heating fluid, as for example gases of combustion having a temperature slightly above the temperature of the reacting materials, may be circulated. Alternatively, I may modify the usual reaction chamber by incorporating therein a series of coils transversely of the direction of flow of the chamber and through these coils circulate the heating medium. I have also devised a novel construction in which the inner shell of the form first described is integral with the dome of the reaction chamber.

My invention will be best understood by reference to the following detailed description taken with the annexed drawings, in which Figure 1 is an elevational view, partly in section, of a reaction chamber equipped with a heat-compensating jacket;

Figure 5 is a view corresponding to Figure 1 of a modification in which heating coils are provided; and Figure 6 is a view in horizontal section taken along the line 6—6 of Figure 5.

Figure 1:
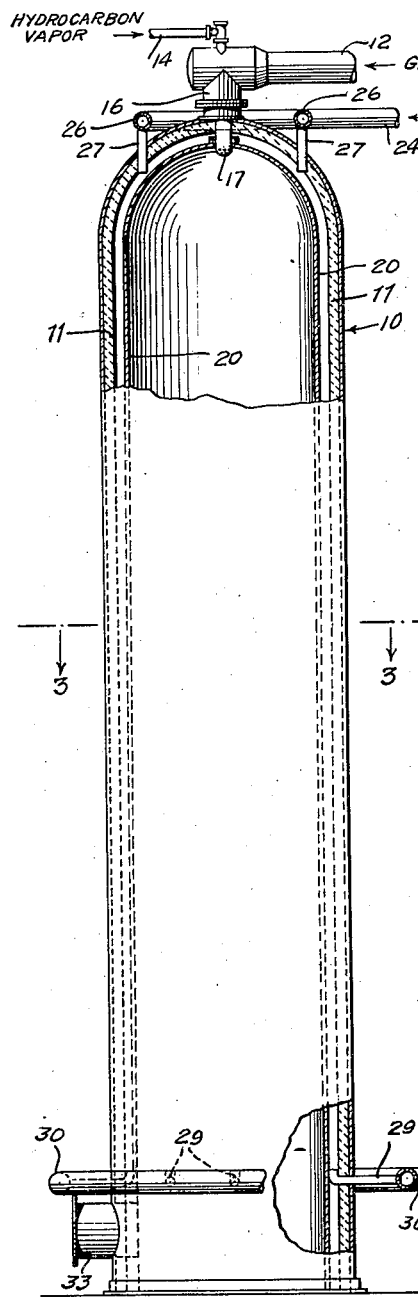
Figure 2:
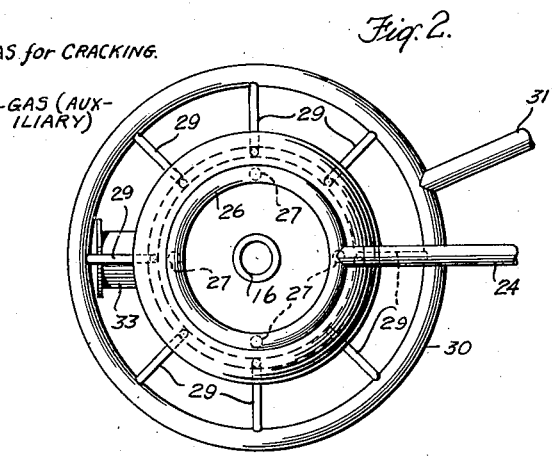
Figure 2 is a plan view of the chamber but with the vapor and gas connections removed.
Figure 3:
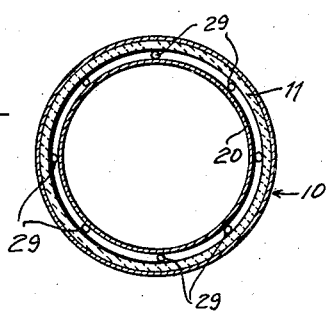
Figure 3 is a view in section taken on line 3—3 of Figure 1.

Referring now to the drawings in greater detail, 10 denotes an exterior shell of a reaction chamber which has a refractory lining 11. Leading into the top of the chamber are the pipe 12 for the heated heat-carrier gas and a small pipe 14 for the vapor to be cracked. The two fluids mingle in the neck or nipple 16 and the mixture enters the chamber through a perforated member 17.

Within the reaction chamber and spaced slightly from the insulation 11 a further shell 20, preferably of metal, is provided which receives the mingled fluids from member 17 and is constructed to constitute a space between it and the lining 11 through which space an auxiliary heating fluid may be circulated. Such an auxiliary heating fluid is admitted through a pipe 24 to bustle pipe 26 and thence into the space between the members 11 and 20 by means of the connections 27. The gas so introduced passes downwardly through the jacket and out through radial pipes 29 joining the lower bustle pipe 30, which latter is provided with a conduit 31. The gas and (now converted) vapor mixture within the reaction chamber proper leaves this chamber through a conduit 33. The shell 20 is held in place partly by its connection with the perforated member 17 and by other spacing members, not shown, which are located between the two shells.

Figure 4:
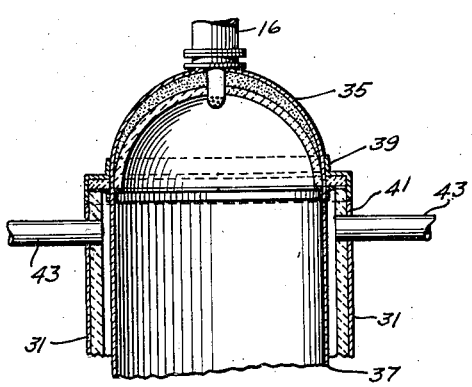
Figure 4 is a view in vertical section of the upper portion of the reaction chamber showing a modified construction.

In Figure 4 I show a modified construction in which the dome 35 of the chamber is integral with the internal shell 37 of the reaction chamber. Over the lower portion of the dome 35 fits a sealing member 39 which is joined to the outer shell 31, such member 39 forming a sliding joint of the dome 35 thereby permitting any movement of expansion between the dome 35 (which is integral with the shell 37) and the sealing member 39 due to expansion. Radial members 43 are arranged around the periphery of the shell 41 and provide for the admission of gas to within the shell.

In Figures 5 and 6 I have provided a construction in which a plurality of heating coils are substituted for the jacket. In these figures, 50 denotes a supply conduit for heated gases, which conduit is joined by coils 52, 53, 54, 55 arranged in spaced relation throughout the reaction chamber, such coils also being connected with an exit conduit 57 which conveniently is of increasing diameter in an upper direction as shown.

In operation, oil vapor superheated to a temperature say of 850° F. is mingled with the heat-carrier gas having a temperature of around 1200° F., the initial temperature of the mixture being 960° F. The temperature of the gas fed to the jacket may be from 5 to 15° higher than this, thereby causing the temperature gradient in a horizontal direction to lead into the reaction chamber instead of out of it as would occur if the jacket were not employed. In this manner loss due to radiation is compensated for whereby the reaction undergone by the oil vapor is made more uniform throughout the chamber.

As a source of the heating gas for the jacket, I employ preferably gases of combustion whose temperature is carefully regulated by means not a part of this invention.

I claim:

1. In the method of converting hydrocarbons in the vapor phase, the steps which consist in establishing a reaction zone, admitting to said zone the vapor of the oil to be converted, also admitting to said zone the heated heat-carrier gas containing sufficient heat units to accomplish the conversion of the vapors so admitted, permitting the conversion reaction to take place throughout the length of the reaction zone and supplying heat to said zone in a quantity not substantially greater than that necessary to compensate for loss by radiation by maintaining metal heating surfaces in said zone at a slightly higher temperature than the temperature of the reacting materials said reaction zone being otherwise non-externally heated.

2. In the method of converting hydrocarbons in the vapor phase, the steps which consist in establishing a reaction zone of non-insulating material, admitting to said zone the vapor of the oil to be converted, also admitting to said zone the heated heat-carrier gas containing sufficient heat units to accomplish the conversion of the vapors so admitted, permitting the conversion reaction to take place throughout the length of the reaction zone and providing a surrounding zone of slightly higher temperature just sufficient to create a temperature gradient leading into the reaction zone rather than out of it said reaction zone being otherwise non-externally heated.

3. In an apparatus for converting hydrocarbons in the vapor phase, an elongated reaction chamber having a dome of metal and comprising a metallic shell and a refractory lining therefor, a shell spaced from said refractory lining constituting the reaction chamber proper and forming with said refractory lining a heating jacket for the reaction chamber proper, said inner shell being extended upwardly so as to be integral with the metal of said dome, means for admitting at the top of said reaction chamber proper the oil vapor to be converted and the heat-carrier gas, and means for removing from the chamber at the other end thereof the converted products such arrangement permitting the reaction chamber proper to have a movement of expansion or contraction with reference to said jacket.

4. The method according to claim 1 in which said heating surfaces are heated by means of a gas having a temperature from 5 to 15° F. higher than the temperature within the reaction zone.

5. In the method of converting hydrocarbons in the vapor phase, the steps which consist in establishing a reaction zone, admitting to said zone the vapor of the oil to be converted, also admitting to said zone the heated heat-carrier gas containing sufficient heat units to accomplish the conversion of the vapors so admitted, the mixture thus formed having an initial temperature of approximately 960° F., permitting the conversion reaction to take place throughout the length of the reaction zone and supplying heat to said zone in a quantity not substantially greater than that necessary to compensate for loss by radiation by maintaining metal heating surfaces in said zone at a higher temperature than the temperature of the reacting materials, said metal heating surfaces being heated by means of a gas having a temperature approximately 15° F. higher than the temperature within the reaction zone.

6. In the method of converting hydrocarbons in the vapor phase, the steps which consist in establishing a reaction zone of non-insulating material, admitting to said zone the vapor of the oil to be converted, also admitting to said zone the heated heat-carrier gas containing sufficient heat units to accomplish the conversion of the vapors so admitted, the mixture thus formed having an initial temperature of approximately 960° F., permitting the conversion reaction to take place throughout the length of the reaction zone and providing a surrounding zone of higher temperature just sufficient to create a temperature gradient of approximately 15° F. into the reaction zone rather than out of it.

ALBERT P. SACHS.